No. 118,996.  Patented Sep. 12, 1871.
[47.] Four Sheets. II
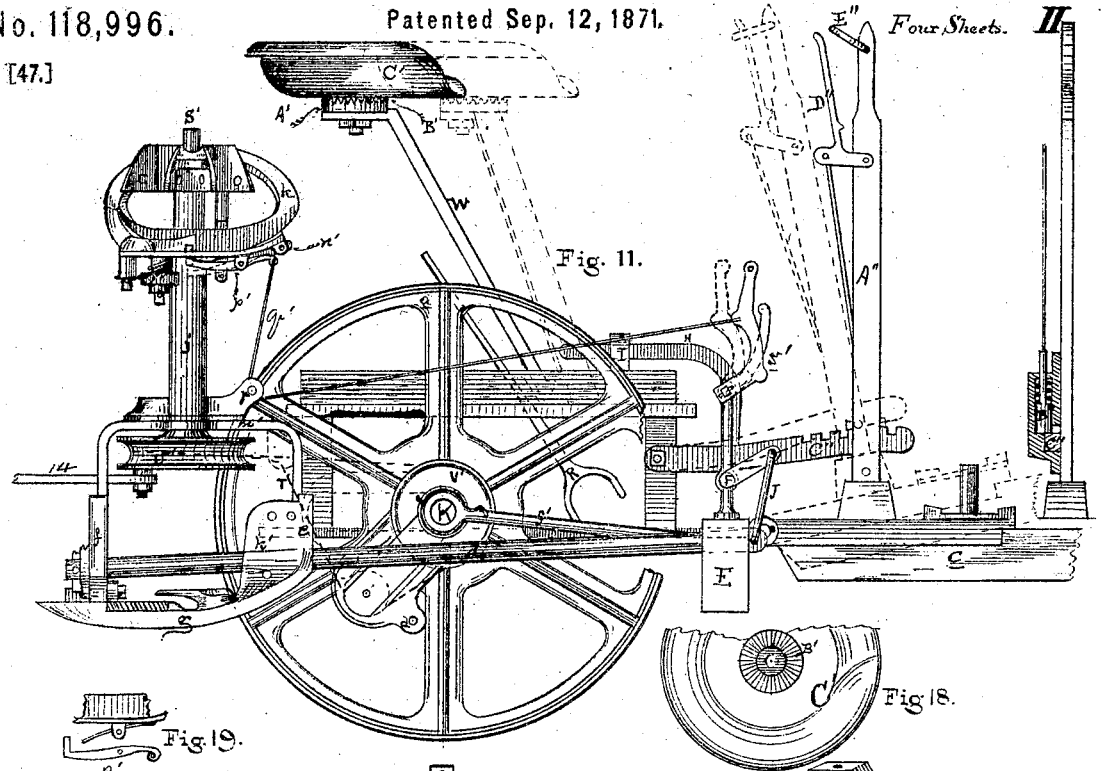
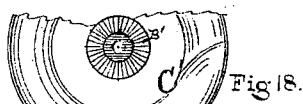
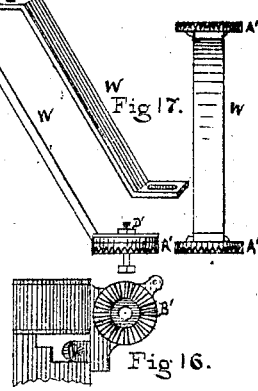
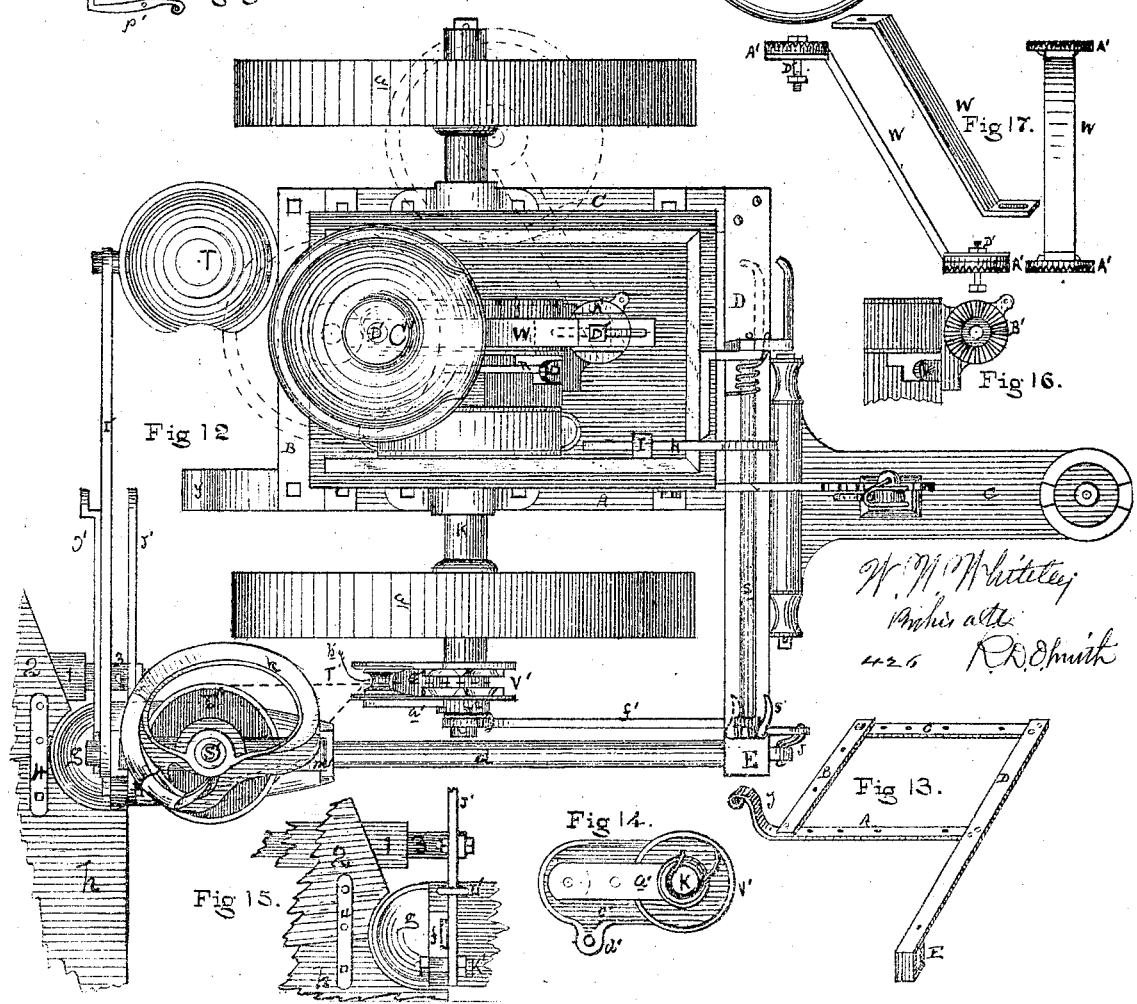

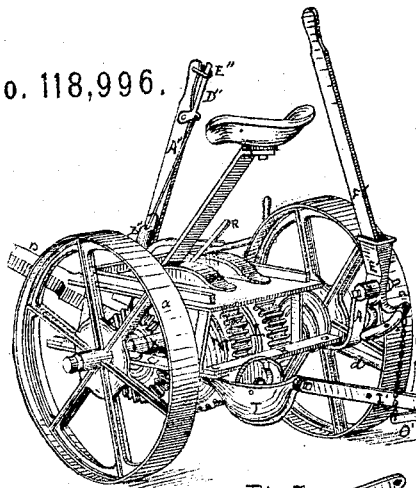
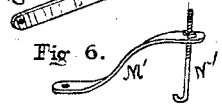
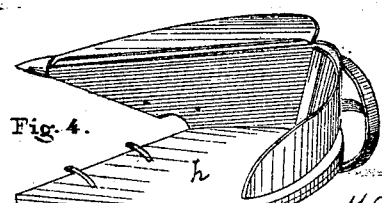
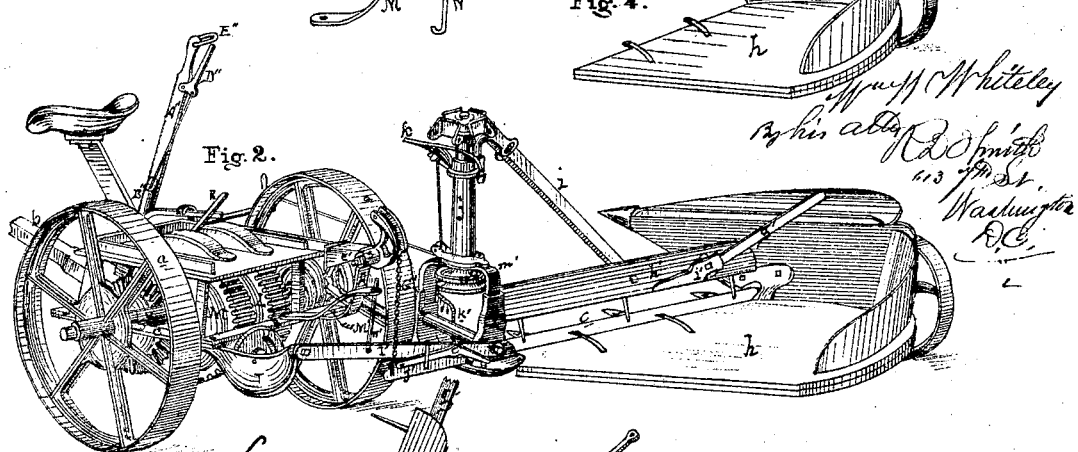
No. 118,996. Patented Sep. 12, 1871.
Improvement in Harvesters,
W. N. WHITELEY,
Springfield, Ohio.

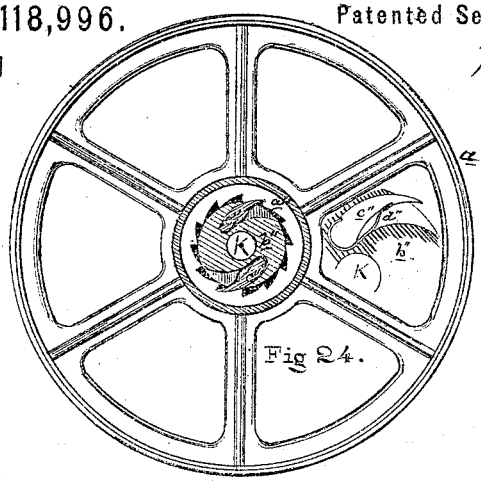
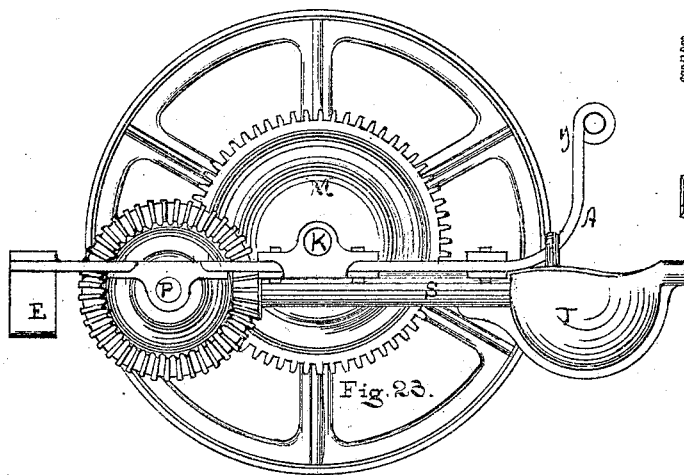
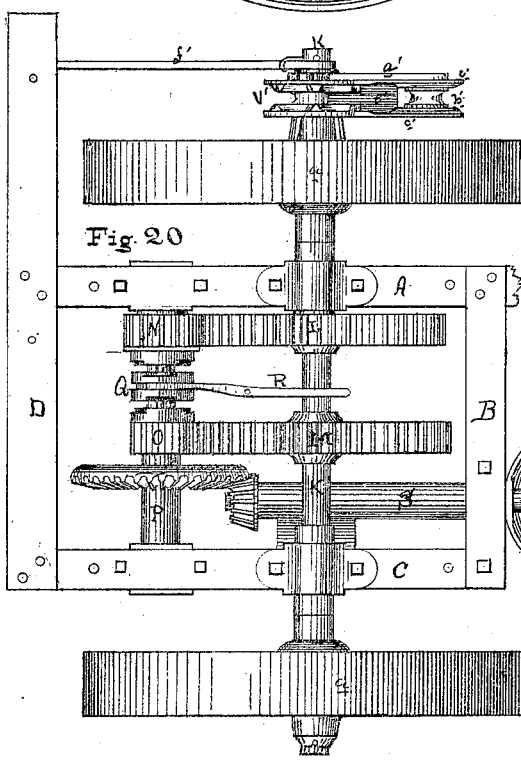
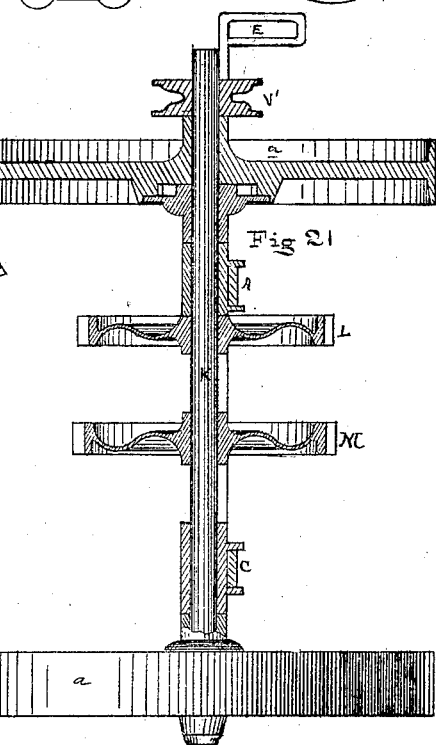
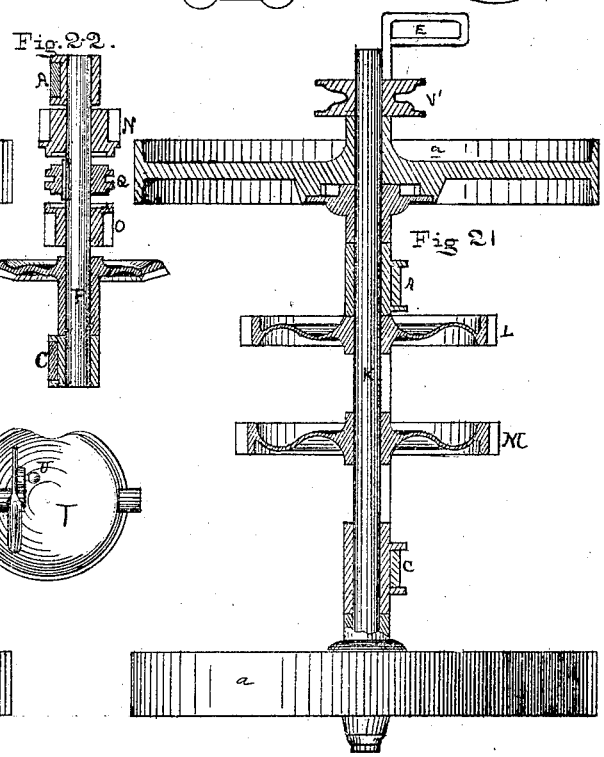
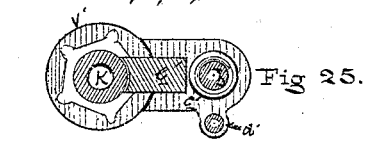
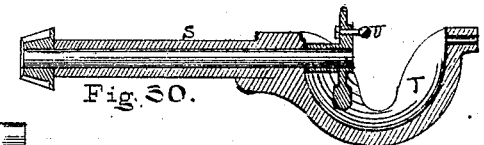
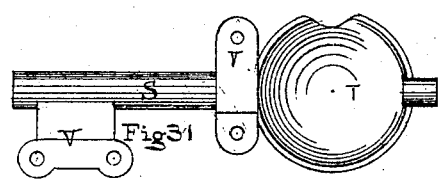

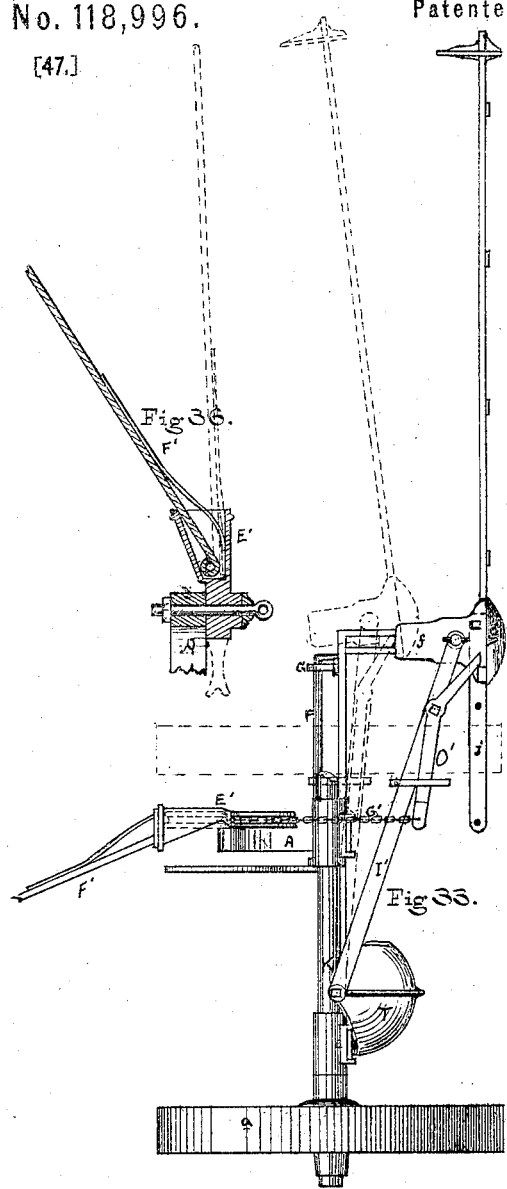
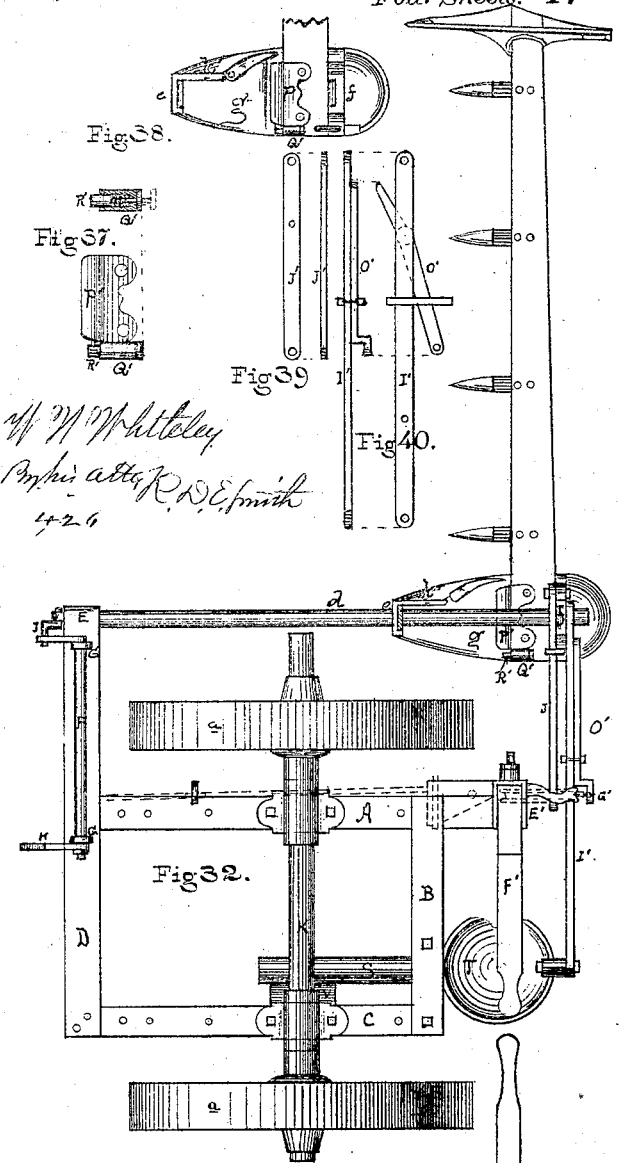
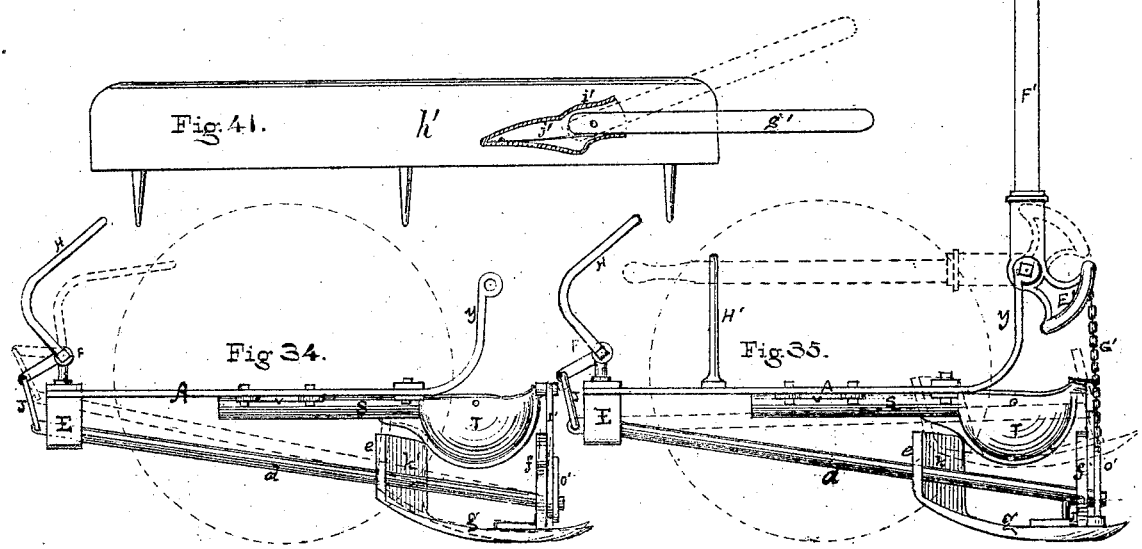

UNITED STATES PATENT OFFICE.

WILLIAM N. WHITELEY, OF SPRINGFIELD, OHIO.

IMPROVEMENT IN HARVESTERS.

Specification forming part of Letters Patent No. 118,996, dated September 12, 1871.

*To all whom it may concern:*

Be it known that I, WILLIAM N. WHITELEY, of Springfield, in the county of Clark and State of Ohio, have invented a new and useful Improvement in Harvesters; and I do hereby declare the following to be a full, clear, and exact description of the same, reference being had to the accompanying drawing, in which—

Figure 1 is a perspective view of my machine arranged as a mower. Fig. 2 is a perspective view of the same arranged as a reaper, with automatic side delivery-rake. Fig. 3 is a perspective view of the same arranged with supplemental platform to carry binders. Fig. 4 is a perspective view of quadrant platform detached. Fig. 5 is a perspective view of supplemental binders, platform, and stand attached. Fig. 6, spring to partially support cutting apparatus while mowing. Fig. 7, extension-arm for cutting apparatus. Fig. 8, pitman to drive the gather-board on the supplemental platform. Fig. 9, gather-board working over supplemental platform. Fig. 10, drag-chains for supplemental platform. Fig. 11 is a side elevation of the main frame and mechanism of my machine. Fig. 12 is a general plan view of the same. Fig. 13 is a perspective view of the main frame, showing the mode of constructing it. Fig. 14 is a side elevation of the tightener for rake-driving chain. Fig. 15 is a plan of the heel of inner shoe, showing manner of connecting the platforms thereto. Fig. 16, plan of foot-plate for leg of driver's seat. Fig. 17, perspective and elevations of leg for driver's seat. Fig. 18, bottom plan for driver's seat. Fig. 19, elevation of stop-latch, detached, for rake-switch. Fig. 20 is a plan view of main frame and driving mechanism. Fig. 21 is a vertical section in the line of the main driving-shaft. Fig. 22 is a similar section in line of pinion-shaft. Fig. 23 is a side elevation, showing relative positions of gearing. Fig. 24, elevation of driving-wheel. Figs. 25, 26, 27, 28, details of tightener for rake-driving chain. Fig. 29, elevation of cutter's crank-shaft. Fig. 30, section of cutter's crank-shaft, box, and shield. Fig. 31 is a plan of the said box and shield. Fig. 32 is a plan, showing connection of cutting apparatus when mowing. Fig. 33 is a rear elevation of same. Figs. 34, 35, side elevations, to show the motions of inner shoe in rising from the ground and in raising the points of the cutters. Fig. 36 is a section of lifting-lever, to show the pivoted lever. Fig. 37, plan of the knife-plate and latch. Fig. 38, plan of inner shoe. Fig. 39, side and edge elevation of extension-arm for cutting apparatus. Fig. 40, edge and side elevation of lateral brace and supplemental lever. Fig. 41, side elevation rake-head, showing attachment of the spring extension-arm on the same.

This invention relates to that class of harvesters known as two-wheeled jointed-bar combined reapers and mowers.

It is provided with two supporting and driving-wheels, $a\ a$; a tongue or draft-pole, $b$, which can be made rigid or flexible, as may be desired; a cutting apparatus, $c$, provided with open-slotted guards and scalloped cutters, said cutting apparatus being advanced by means of a drag-bar, $d$, which, at its rear end, passes through two lugs, $e\ f$, erected on the front and rear ends of the inner shoe $g$; and said shoe and cutting apparatus is thereby pivoted upon said drag-bar. The front end of said drag-bar is attached to the front end of the inner frame outside of the plane of the wheel $a$ on that side, and is thereby advanced when the machine advances. The cutting apparatus is maintained in proper position laterally by means of a coupling-arm or brace, $l'$, which, at one end, is jointed to the frame in line with the cutter's crank-shaft, and at the other end around the drag-bar $d$. A quadrant platform, $h$, is attached to the rear edge of the finger-bar when the machine is employed for reaping, and is detached when the machine is required as a mower. A revolving rake and reel, $i$, is mounted upon a hollow post, $j$, through which the reel-shaft passes. The post $j$ is mounted upon a bridge, $m'$, the ends of which are secured to the lugs $e\ f$. At the upper end of the post $j$ is a cam track-way, $k$, to guide the rake and reel-arms in their revolution. The rake and reel are driven by a chain, T, passing over a sprocket-pulley, V', on the end of the main axle, and a pulley, U', on the lower end of the rake-shaft.

The above-named parts, being common in similar machines and well understood, do not require any further description.

The different parts of my invention will now be described in their order.

The main frame of my machine is constructed of four principal bars, A B C D, Fig. 13, of iron or steel, riveted or otherwise secured together at their points of intersection so as to form a rectangular structure with parallel sides, as shown particularly in Figs. 13 and 32. The side bar A is extended backward beyond its junction with the rear bar B, and is bent upward, as at y, Figs. 13, 34, and 35, and its extremity formed into an eye or loop so as to make a fulcrum or joint for the lifting-bar, by means of which the cutting apparatus is elevated from the ground. This forms the principal peculiarity of my frame, and the subject of the first claim.

It is desirable that the points of the guard-fingers and cutters of a harvester shall be adjustable up and down, as may be required by the condition of the crop which is being cut, without changing the distance of the whole cutting apparatus from the ground; and it is desirable that said adjustment shall be possible at any moment while the machine is in motion and under control of the driver. Many devices have been contrived to accomplish this purpose, and I prefer to employ a drag-bar, secured to the inner shoe of the cutting apparatus and adjustable up and down at its front end. The backward stress upon the cutting apparatus increasing toward the outer end of the same must necessarily be mainly resisted by the drag-bar attached to the shoe, and it, therefore, is necessary to support the front end of said drag-bar against lateral movements, and in such a manner that it may also be at liberty to move up and down. In order to thus support the front end of the drag-bar, and impose the strain thereof directly upon the main frame, I extend the front bar D of said main frame beyond its junction with the inner side bar A as far as it may be necessary, i. e., to the line of the drag-bar, and from a rectangular loop, E, by bending the extremity of said bar D around a suitable former or otherwise, and welding or otherwise securing the extremity to the main part of said bar at the point where they join after bending, as described. The loop E is transversely wide enough to admit the end of the drag-bar and vertically it is four or five times the diameter of said bar, which may therefore have the necessary up-and-down movement therein. It will be perceived from the above that the principal strains are imposed directly upon the bars of the main frame without the intervention of detachable parts, which not only increase the weight of the frame but also increase the cost, because they require separate handling and additional pieces to secure them in place. The front end of the drag-bar is raised or lowered by means of a rock-shaft, F, Figs. 11, 32, and 33, which is mounted in bearings G upon the front bar D. The rock-shaft F has a lever, H, attached, which is bent over backward so that it may be secured under a hook, I, Figs. 11 and 12, when the drag-bar is maintained at the upper end of its loop E. The drag-bar is connected to the rock-shaft by a link, J, and when the lever H is liberated from the hook I the front end of the drag-bar sinks to the bottom of the loop E and the points of the cutters are depressed. The required movements of the lever H may be produced by means of the foot of the driver while on his seat and while the machine is in motion.

I have arranged upon the main driving-axle K, Figs. 20 and 21, two fast gear-wheels, L M, and they mesh with two loose pinions N O, located upon the pinion-shaft P. A clutch-collar, Q, is placed on the shaft P between the pinions N O, and slides on a feather thereon, so that it may be moved into engagement with either one of said pinions, or may rest without engagement between them. A shipping-lever, R, serves to move the clutch-collar, and said shipper projects above through the foot-board so as to be conveniently reached and moved by the foot of the driver whenever he desires to put the mechanism in or out of gear. I construct the tubular box S in one single piece, also solid, with the shield-cup T, within which the pitman-crank U rotates, and the boss or lug at the rear edge of said shield-cup, upon which is formed the joint or wrist for the brace I'. The lugs V V, to connect said box rigidly to the frame, are also cast solid with the pipe-box S, and so arranged that the same bolts which secure the axle-box at that side to the frame and the bars B and C at their junction also secure the pipe-box to the frame and thereby exert a material bracing action upon the frame. The operation of constructing and attaching said box and frame is not only facilitated, but there is also a material saving in the materials required.

It is desirable always that the seat should be adjustable in such a way that the weight of the driver may be disposed at the proper point to balance the machine either as to the pressure upon the horses' necks or its draft upon the ground. It is apparent that an adjustment in a variety of directions must be necessary to compensate the different weights of various individuals who may operate the machine. I therefore place at top, and at the foot of the spring-leg W, radially-serrated plates A', which are seated upon correspondingly-serrated plates B', the upper one of which is located at the center and under surface of the seat C'. A single center-bolt, D', secures the seat C' to the leg W, and a similar bolt secures the foot of said leg to the platform or foot-board of the machine. The serrated plates A' are made of cast-iron, and are provided with parallel ribs on the back to form a seat for the end of the leg W and prevent any relative rotary movement between said plate and leg; and in order to permit a rectilinear adjustment of the seat C' the foot of the leg W is slotted, as shown in Figs. 12 and 17, so that it may slide forward and backward on the foot-bolt D', and at the same time the seat may be rotated upon said bolt; so that, as will appear evident, by the combination of the rotary and rectilinear movements above described the seat C' may be adjusted over any desired point of the machine.

When the machine is being used for mowing it is necessary that the driver shall have the power to raise and lower the cutting apparatus suddenly to clear any obstruction which may be in its track; but when the seat is movable from side to side it is evident that a lever, not similarly adjustable as to its plane of movement, will sometimes be out of convenient reach of the driver's hand, and I have therefore made the lever-arm movable laterally in a socket in the head E', and as shown in Figs. 33 and 36. A spring is placed also in said socket, which, when permitted to act, throws the lever-arm F' always toward the driver's seat, and conveniently to his hand. When the cutting apparatus is raised the lever F' may be caused to engage with a hook, H', or other stop to maintain said cutting apparatus in that position. The lifting-lever F' has its fulcrum at the extremity of the side bar A, which is bent upward for that purpose, as hereinbefore described and shown.

When this machine is used for reaping the chain G' is attached to the rigid arm J' or extension of the finger-bar, as shown particularly in Fig. 2, by which means the cutting apparatus is still supported by the lifting-lever F' and chain G', and the pivotal point is in a plane which cuts the main axle between the bearing-wheels. The arm J' may be secured to the inner shoe by any suitable means, but I prefer to attach it by means of loop or staple L and a single bolt, K'. By removal of said bolt the arm J' may then be readily removed from the shoe when the machine is to be employed as a mower.

When the machine is used for mowing the cutting apparatus runs upon the ground, the lever F' being released and thrown up, as shown in Figs 1, 32, 33, 35; but in order to lighten the draft of the inner shoe upon the ground I employ a spring-support, M', (see Figs. 2, 3, 6,) which is located upon and rigidly secured to the rear bar B of the frame and projects backward over the joint-brace I', to which its free end is connected by a hook-rod, N', with an adjusting-nut and screw at its upper end. The tension of the spring M' is adjustable, so that the inner shoe will rest upon the ground lightly and a portion of its weight will be supported by the main frame. This device reduces the friction of the shoe upon the ground materially, and correspondingly reduces side draft. I have applied a short supplemental lever, O', Figs. 1, 12, 32, 33, at the side of the joint-brace I', to which it is pivoted at its middle by a bolt which passes through both of said parts. Said lever O' at its outer end bears against the upper surface of the shoe near its inner edge, as shown, and at the inner end of said lever it is attached to the chain G'.

It will appear from the above that as the chain G' is drawn upward it tends to raise the inner shoe and brace I' through the lever O' and its connection to said brace, and at the same time the outer end of the lever O' is impelled downward against the inner edge of the inner shoe, and thereby causes the outer end of the cutting apparatus to rise up as rapidly or more rapidly than the inner shoe, as shown by Fig. 33.

The knife-cap P', Figs. 37 and 38, is cast with a small hollow cylinder, Q', at its inner end, and a latch-bolt, R', is placed within said cylinder, with a coiled spring to impel it forward and cause its end to protrude far enough to engage with the inner end of the cutter-bar and prevent the same from passing out of the guards when the finger-bar should be raised up. The bolt R' has a stem and a head to control and limit the action of the spring. The rake and reel-guide is provided with a switch, by means of which the rake may be guided in its passage above the platform so as to sweep the grain therefrom, or so that it will pass clear above and only act in the manner of a gather-board or beater, and said switch is provided with a latch, n', (see Fig. 11,) which is arranged to be released automatically at each revolution of the rake; or it may be arranged so as to be released at the will of the driver. It is desirable, however, that while the switch is arranged to be operated automatically the driver can also, at any time, prevent the opening of the switch so as to cause the rake to skip during one or more revolutions, as when the grain in the field is of uneven thickness; and to effect this I attach a second latch, p', by the side of the latch a', and said latch may at any time be thrown up so as to stop the switch when released by the automatic movement of the latch n'. As the necessity to operate both of these latches intermittently will not exist, they may be operated by the same device, which can be shifted from one to the other, as may be necessary. Said device consists in a cord, q', which is attached to the latch p', and passes from thence downward under the leading-pulley r' and to the rock-levers s' at the front of the main frame, and in a position to be conveniently operated by the foot of the driver. The rake-shaft s' is driven by a chain, T', connecting its pulley V with the driving-pulley V' on the main axle K. (See Figs. 11, 12, 20, 25, 26.)

The movements of the main frame and driving-mechanism, in passing over undulations of the ground, are independent of the movements of the platform and raking mechanism while passing over similar undulations, and it is, therefore, necessary that the driving-power should be transmitted from the former to the latter through a yielding connection, and a chain is the most satisfactory for said purpose. It is also required that the slack or loose portion of the chain connection shall be controlled and prevented from swaying about, as it sometimes thereby becomes entangled with other parts of the mechanism, or in its own links. I have, therefore, devised the take-up or tightening-pulley, represented in Figs. 11, 12, 14, 20, 25, 26, 27, 28. This tightener consists of an arm, a', with an orifice at one end fitted to the axle K, outside of the driving-pulley V', which is rigidly secured to the hub of the outer driving-wheel and forms a part of the same. At the outer end of the arm a' is a pulley, b', under which the slack of the driving-chain T' passes. On each side of the pulley b', and attached rigidly to the arm a', are two guard-plates, c', to retain the chain T' in proper position, and the plates c' are connected below the pulley b by a bolt, d', between which and the pulley b' the chain-wheel runs, so that it cannot by any accidental cause become detached from its tightening or take-up pulley. There is also between the pulleys V' and b', and secured to the plates c', a partition-plate, e', provided with a tongue extending back into the groove of the pulley V', as shown in Figs. 20, 26, and 27. This serves to weight the take-up, and also to prevent the entanglement of the chain with the sprockets of the pulley V'. Sudden jerks or jars may overcome the inertia of a weighted take-up, and it is, therefore, thought to be advisable to add a spring to act in conjunction with said weight, and said spring is conveniently applied, as shown in Figs. 11, 12, 20, 27—i. e., a coiled spring laid in a shallow cell in the arm, a', around the axle K, one end of said spring being attached to the take-up arm a' and its other end being attached to some stationary part of the machine. In this case the outer end of the spring is hooked over the string-brace f', which supports the end of the axle K, as shown in Figs. 11, 12, 20.

A flexible extension arm has heretofore been attached to the outer end of the reel-blade or gatherer. Said arm operates upon grain standing beyond the reach of the gatherer and in line with the point of the divider. It is necessary that the said arm should be flexible, so that it will rise up or over the divider as the gatherer sweeps back toward the cutters, or it would otherwise be broken. Heretofore said extension arm has been merely jointed to the gatherer, and depended upon its own gravity to bring it to operative position when the gatherer descends. It has been found that it would frequently fail to act as intended, the joint having become impeded with dust, &c., or from other causes. For these reasons I have, as shown in Fig. 41, attached the extension arm $g'$ to the side of the gatherer $h'$, by means of a joint and covering-plate, $i'$, beneath which said joint is protected; and I place a spring, $j$, also beneath the plate $i'$, to insure the return of the extension arm to its proper position as soon as the gatherer $h'$ has passed away from the divider.

This machine being designed particularly to meet the requirements of all classes of farmers, I have constructed the shoe with a view to the use of a common overhung reel, if it is preferred to use a dropper or to rake by hand. For this purpose I have constructed the inner shoe with a longitudinal flange, $k'$, (see Figs. 1, 2, 3, 11, 32, 34, 35, 38,) and said flange is provided with bolt-holes, so that when the bridge $m'$ is detached from the front and rear lugs of the shoe and the reel and rake are thereby removed from the machine, another reel-post bearing an ordinary overhung reel may be readily attached by bolts to said flange.

When the machine is employed as a mower the tongue-joint is made loose or flexible, and when the machine is employed as a reaper said joint is made rigid. When mowing, also, the heel of the cutting apparatus may be suddenly raised from the ground, to clear any obstruction thereon, by suddenly depressing the front end of the main frame. To accomplish these purposes a lever, A'', is located upon the heel of the tongue c, and projects upward therefrom, so that it may be grasped by the hand of the driver. As he pulls the top of the said lever toward him the front of the machine will be depressed, and when he pushes it away from him it will be elevated. In order to fix the tongue at any desired relative angle to the main frame a latch, B'', is placed upon the side of the said lever, and engages with a notched segment, c'', attached by a joint to the main frame. The latch-bolt is thrown forward by a spring located within its cylindrical case, and is withdrawn by means of a crank-lever, D'', and connecting-rod, as shown in Fig. 11. The crank-lever D'' is jointed to the lever A'' at its upper end, so that it may be operated by the hand as it grasps said lever; and when the tongue-joint is intended to remain loose, as in mowing, the crank-lever D'' is permanently depressed by a loop, E'', which may at any time be brought down over said lever to hold it, as shown in Fig. 1.

The driving-wheels $a$ are each provided with a ratchet-pawl connection of peculiar construction—that is to say, the wheel-hub $a''$, Fig. 24, is cast with a ratchet-recess, as shown, and the hub $b''$ on the main axle is formed with two eccentric or cam-shaped slots or recesses, in which the pawls $c''$ are seated. The form and extent of the recess is such that the pawl $c''$ does not require any other fastening than its spring $d''$ to retain it in place. The spring is made to pass entirely around the head of the pawl, as shown, and constantly acts in such a manner as will prevent the removal of the pawl without the application of force. The spring is also caused to form the bearing surface between the head of the pawl and its seat, which will increase the ease of movement and the durability of these parts.

Having described my invention, what I claim as new as to this patent is—

1. The rectangular wrought-iron main frame, constructed with the side bars A extended backward and upward to form a bearing, $y$, for the lever which lifts the cutting apparatus, and the front bar D extended sidewise and bent to form a rectangular loop, E, for the forward end of the drag-bar, as set forth.

2. The long pinion-shaft pipe-box S, cast in one piece with the fly-wheel shield T and flanges, and attached to the main frame by the same bolts which secure the main axle-boxes, as and for the purpose set forth.

3. In combination with the seat-leg W, slotted at its lower end, the serrated plates A B A' B', to render the seat C' adjustable in a horizontal plane in any direction, as set forth.

4. In combination with the segment E' pivoted to the fulcrum $y$, the lever F' pivoted in a socket made in said segment, substantially as and for the purpose set forth.

5. The extension arm J', combined with the cutting apparatus, lifting-lever, and main frame, so that the lifting-lever may raise and lower the cutting apparatus and its pivotal point shall be between the planes of the bearing-wheels.

6. In combination with the rake-switch and the latch $k'$, the supplemental latch $p'$ to arrest the switch and hold it when released by the automatic latch $k'$.

7. The sprocket-chain wheel $V'$, in combination with the arm $a'$, divider $e'$, take-up wheel $b'$, and adjustable tension-spring, as set forth.

8. A flexible-spring gathering-arm arranged upon the rake or reel-blade, substantially in the manner shown and described.

9. The flange $k'$ upon the inner shoe $g$, arranged in connection with the lugs $e\ f$, as and for the purpose set forth.

WILLIAM N. WHITELEY.

Witnesses:
L. J. PRINGLE,
WM. T. STILWELL.   (47.)